Aug. 31, 1965   A. BLAAUW ETAL   3,203,162
AGRICULTURAL MOWER
Filed May 20, 1963   2 Sheets-Sheet 2

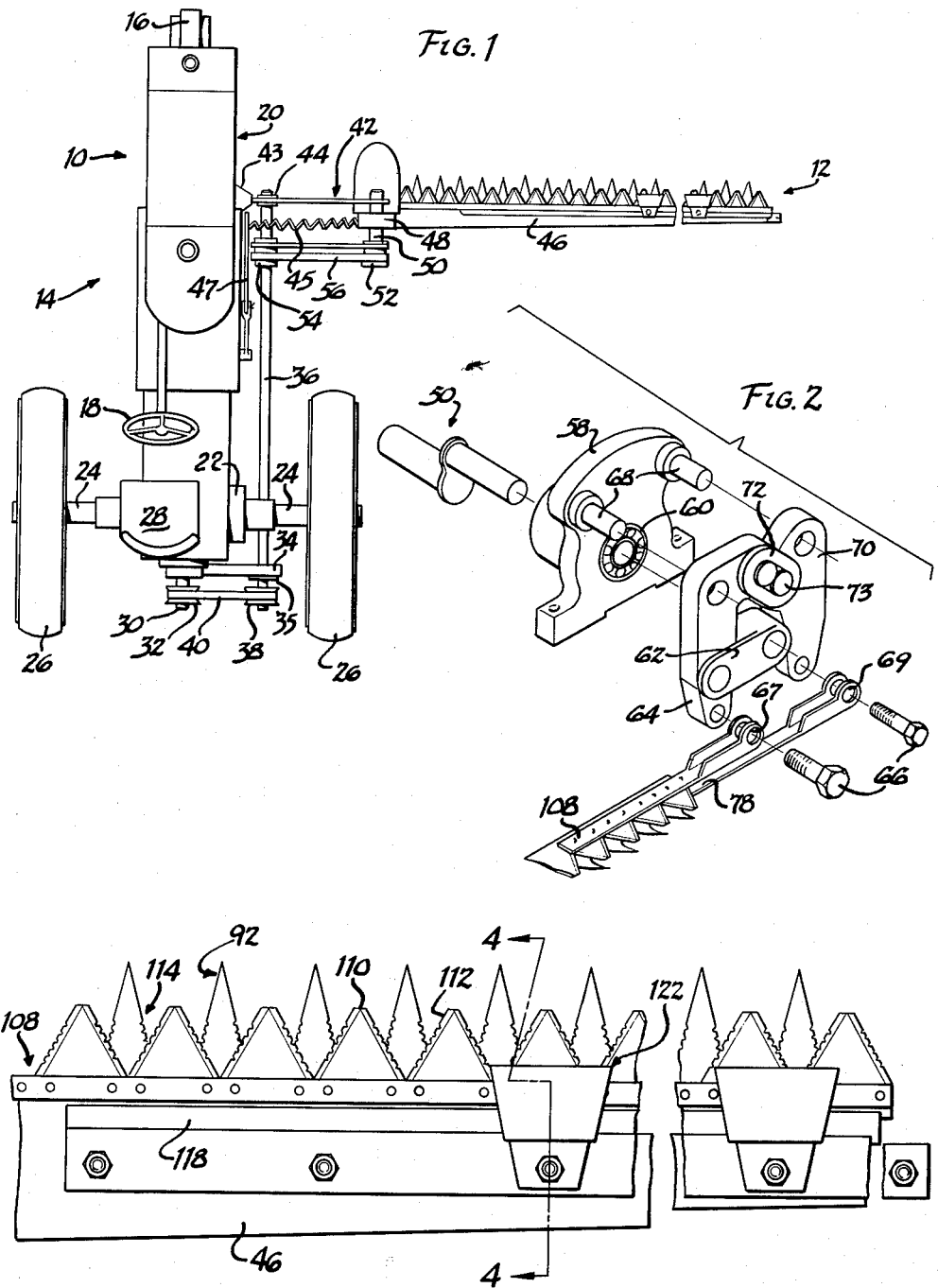

INVENTORS
ANDREW BLAAUW
BY FLOYD W. HOWARTER
WILSON, SETTLE & CRAIG
ATTORNEYS

United States Patent Office 3,203,162
Patented Aug. 31, 1965

3,203,162
AGRICULTURAL MOWER
Andrew Blaauw, 114 S. Prairie Ave., Bloomingdale, Ill., and Floyd W. Howarter, 2661 E. 78th St., Chicago, Ill.
Filed May 20, 1963, Ser. No. 281,501
4 Claims. (Cl. 56—297)

This invention relates to agricultural mowers, and more particularly to improvements in reciprocable sickle bar mowers.

Reciprocable sickle bar type agricultural mowers are well known in the art. These as a general rule have performed very notably for the farmer, the road maintenance man and others in effecting their appointed rounds. However, certain defects and problems arising from the operation and construction of these mowers are well known to those skilled in the art as follows:

(1) In particularly heavy foliage such as lush hay crops, a single reciprocable sickle bar mower does not provide a sufficiently vigorous cutting action and either becomes jammed or fails to cut the crop properly.

(2) As is well known, this type of mower requires a rock guard or shoe to extend forwardly and in front of the tips of the teeth of the cutter bar to protect the teeth against breakage. These are expensive castings which are fabricated and separately attached in plurality to the cutter bar to extend forward of the leading edge of the teeth of the mower. The expense of such construction is obvious and these elements add substantial weight to the mower. This weight requires heavier and more expensive bearings, support members, etc., in order to provide satisfactory service.

(3) Further, as is well known, conventional sickle bar mowers become dulled rather rapidly; sharpening and maintenance are costly.

Accordingly, in view of the foregoing, a substantial advance to the art would be provided by a reciprocable sickle bar mower having the following features and inherent advantages:

The reciprocating elements of the mower are constantly maintained in biased, shearing relation relative to one another, and thus wear is automatically compensated. The result is a substantially perpetual self-sharpening action along with greatly improved cutting.

A novel mower structure in which advantage is taken of stamped and hardened parts to facilitate improved manufacturing at reduced cost; to provide a lighter weight structure, yet one which is more efficient and characterized by improved durability.

Objects

Accordingly, it is an important object of the present invention to provide a novel agricultural mower of the reciprocable sickle bar type.

Another object is to provide a novel reciprocable sickle bar mower construction including a combination tooth and guard, the latter functioning to increase the coefficient of friction between the stem of forage and the cutting edge and to lift lodged or downed foliage.

A still further object is to provide a mower characterized by longer section life wherein the sections not only remain sharp for an indefinite period but are characterized by substantially reduced wear.

A still further object is to provide a reciprocable sickle bar mower including a section of a shape such that it will pick up, guide and hold the stem in place for the shearing action.

Other objects of this invention will appear in the following description and appended claims, reference being had to the accompanying drawings forming a part of this specification wherein like reference characters designate corresponding parts in the several views.

FIGURE 1 is a plan view of an agricultural tractor having a novel mower of invention attached thereto in operable relation;

FIGURE 2 is a fragmentary perspective of a sickle drive that can be used in the present invention;

FIGURE 3 is an enlarged fragmentary plan view of a section of the mower of FIGURE 1, illustrating a first embodiment of the guard section;

Figure 4:
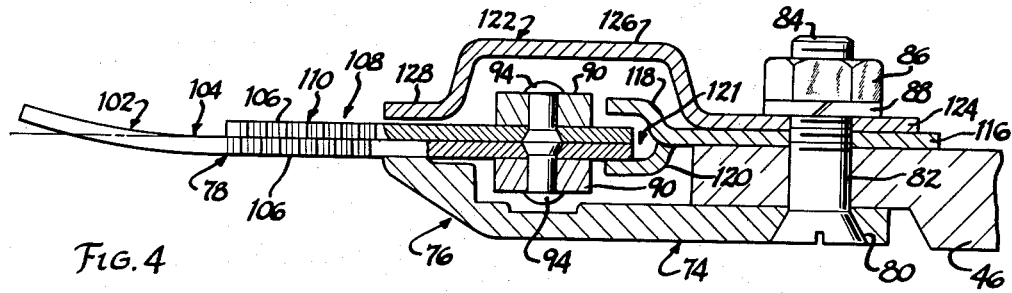
FIGURE 4 is a section view taken along line 4—4 of FIGURE 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The environment

The environmental surrounding for the mower of the present invention comprises an agricultural tractor, designated by the reference numeral 10 in FIGURE 1. The mower of invention is designated 12 and, as will become apparent through the following description, is of the improved, reciprocable, double sickle bar type action, and is attached to the tractor 10 in operative relationship.

The tractor 10 comprises a frame 14 that is supported at the front end by a ground engageable and steerable wheel 16, operatively connected with a steering wheel 18. The tractor further comprises an engine 20, carried at the forward end of the frame or chassis 14 to provide motive power for the tractor itself and attachments such as the mower 12 through appropriate power take-off and gearing.

At the rear of the tractor frame 14, there is located a differential and rear axle housing 22 containing drive and power take-off gearing assembly (not visible) and operably connected to the engine 20 by a drive shaft concealed on the underside of the chassis 14. The rear axle housing 22 is adapted to rotatably support rear axles 24, having drive wheels 26 at their outer ends for propelling the tractor 10 in a forward or reverse manner as desired.

A seat 28 is supported above the rear axle housing 22 and adjacent the steering wheel 18 whereby an operator can sit and manipulate the steering wheel and other controls for running the tractor.

Extending from the rear of rear axle housing 22 is a power take-off shaft 30 having a pulley 32 secured thereto by suitable means. A support bracket 34 is also carried by the rear axle housing 22 and contains at its outer end a bearing 35 to receive an elongated jack shaft 36.

The rear end of shaft 36 extends through the bearing 35 and its exposed end is fitted with a pulley 38, operably aligned with the power take-off pulley 32. A belt 40 laps pulleys 32 and 38 in driving relation.

A mower support bracket 42 is adapted to be supported at the front of tractor frame 14 by a bracket 43 which is connected to the frame of the tractor as by bolts, not shown. The bracket 42 carries a bearing 44 which in turn supports the front end of the shaft 36 in rotatable relation.

The mower structure

The mower 12 is carried by the support bracket 42 for pivotal movement, so that it can be manipulated between a horizontal ground or standing crop-cutting position to a raised position, either for transport, bank work, tree trimming or the like.

The mower 12 includes an elongated cutter bar 46 with a transmission drive housing 48 at the inner end. The drive housing 48 is pivotally connected to the outer end of the mower support bracket 42 to thereby support the entire mower 12 for the previously mentioned pivotal movement.

A spring 45 extends between a pivoted lever 47 carried by the tractor, to floatably support the cutter bar 46 and assist in raising the mower when desired.

As shown in FIGURE 2, the driving mechanism contained within the drive housing 48 comprises a single stroke crankshaft 50. Referring back now to FIGURE 1, it will be noted that crankshaft 50 extends out through the rear end of the housing 48. Operative connection between the exposed end of the crankshaft 50 and the drive shaft 36 and thus to the power take-off shaft 30 is provided by two V-pulleys 52 on the crankshaft and 54 on shaft 36. V-belts 56 lap pulleys 52, 54 in driving relation.

Referring again to FIGURE 2, there is shown a main body member 58 that carries bearings 60 for support of the body or shaft portion crankshaft. A connecting rod 62 has one end fitted on the throw portion of the crankshaft 50 and the other end pivotally connected to a rocker arm 64 to transmit the radial motion of the crankshaft into reciprocable motion that drives the upper sickle section 108. A bolt 66 extends through a bracket 67 on the upper sickle section 108 and an aperture in a rocker arm 64 for operative connection.

Rocker arm 64 is pivotally mounted at its upper end on a pivot pin 68 carried by main body member 58.

A second rocker arm 70 is also pivoted at its upper end on a second pivot pin 68 also carried by main body member 58. At its lower end, the second rocker arm 70 is also fastened by means of a bolt 66 through an appropriate yoke 69 to the lower sickle section 78.

The rocker arms 64 and 70 are interconnected at their upper ends through a link 72, pinned at its ends as at 73 to each of the rocker arms.

In view of the foregoing environment background description, a complete description of the inventive parts of the mower and the interrelation and operation of the parts now follows:

The mower of invention—First embodiment

Figure 5:
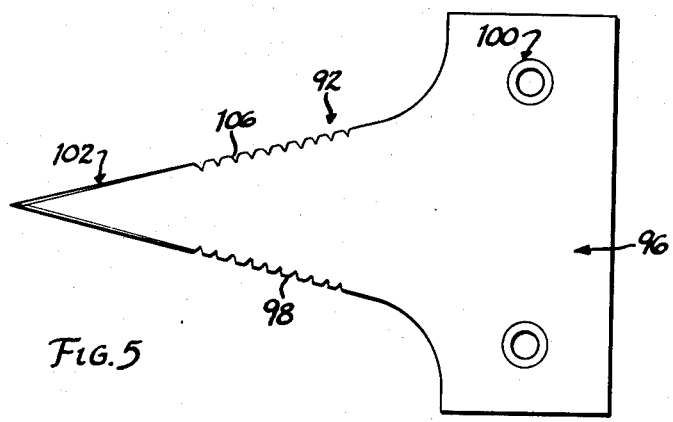
FIGURE 5 is a plan view of a guard section used in the first embodiment.

This embodiment of the invention is shown in detail in FIGURES 3, 4 and 5. The cutter bar 46 has previously been alluded to in the description relating to FIGURE 1 and forms the backbone of the mower. This is a substantial piece of flat cold-rolled steel as shown in the section view of FIGURE 4 and supports the upper and lower sickle sections 108 and 78 and other pertinent components as will become evident.

Along the lower front edge of the cutter bar 46 there is secured a lower sickle bar support 74 of flattened plate-like configuration that curves upwardly at its forward edge in the form of a support lip 76. The upper surface of the support lip 76 is smooth to slidably support the lower sickle section assembly 78. The lower sickle bar support 74 is provided adjacent its rear edge with spaced and countersunk openings 80 and aligned holes 82 are formed in the cutter bar 46 for bolts 84 which, with nuts 86 and lock washers 88, retain the sickle bar 46 and lower sickle bar support 74 in operably connected relation.

The lower sickle section assembly 78

This unit comprises a runner bar 90 of elongated configuration and having a plurality of triangular sections or teeth 92, FIGURE 5, riveted thereto as indicated at 94, FIGURE 4.

The particular construction of tooth structures 92, as shown in FIGURE 5, comprises a generally rectangular plate-like base element 96 at the back and a point element 98 extending to the front. The plate element 96 is provided with spaced openings 100 and these are countersunk so that rivets 94 can be headed and smoothed flat. The reason for this, as will be evident from FIGURE 4, is to provide a smooth bearing surface for the corresponding surface of the other upper sickle section 108.

Note that the tip 102, FIGURES 4 and 5, curves upwardly and projects vertically and horizontally beyond the cutting plane of the teeth designated by the reference numeral 104.

Note also that the point element 98 is provided along the intermediate portion thereof with notches or serrations 106 that improve the frictional engagement between the stem of the hay and the cutting edge.

The upper sickle bar assembly

This is best shown in FIGURES 3 and 4 and is designated by the reference numeral 108.

This assembly also comprises a runner bar 90 of rectangular cross section with a plurality of teeth 110. The teeth 110 have inwardly converging cutting edges 112 defining inwardly converging notches 114 relative to the edges of the lower teeth-guard elements 92.

The triangular teeth 110 are secured to the top runner bar 90 by rivets 94 in the same manner as the lower sickle assembly 78. As previously mentioned, the rivets are dressed off flush with the bottom side of the teeth 110 to provide a cooperative bearing surface with the top of the lower sickle section assembly. Thus, provision is made for a sliding scissors-like action between the two sickle sections.

The sickle section guide

As shown in FIGURE 4, the sickle section guide is designated by the reference numeral 116 and is made from rectangular sheet stock with spaced guide elements 118 and 120 pressed in alternate array upwardly and downwardly. These provide a channel 121 that receives in free-fitting relation the rear edges of the lower and upper sickle sections 78 and 108. This element 116 is apertured adjacent its back edge and is retained in position by the bolts 84.

The spring clip members

One of the elements that functions to hold the upper and lower sickle sections in cutting relationship comprises a spring bracket clip 122, shown in plurality in FIGURES 3 and 4. These are suitably stamped of sheet stock and then appropriately hardened for resilience and include a generally rectangular rear portion 124. This rear portion is apertured to receive the previously mentioned bolts 84 for assembly to the cutter bar 46.

The forward portion of each spring bracket element is formed as an inverted U-shaped bridge 126 to provide clearance over the upper sickle section 108. At the forward edge of the bridge portion 126, an abutment lip 128 is provided. This lip comes into engagement with the top surfaces of the teeth 110 during operation of the mower. The spring bracket elements 122 are fabricated of resilient material such as spring steel and thus resiliently engage or cushion the teeth 110 of the upper sickle bar assembly 108 when contacted by the teeth of the lower sickle section assembly 78.

Operation

Point 102 projects vertically beyond the cutting plane and serves as a protection for the upper section, and additionally to lift lodged or downed hay.

At this point it should be mentioned that the extended scope of invention would include the back edges of the upper and lower sections being spaced slightly apart as by an intermediate spacing element carried by the sickle section guide 116 between the upper and lower elements 118, 120 to provide a scissor-like pumping action as set forth in my co-pending application, Serial No. 109,169, filed May 10, 1961, now Patent No. 3,114,230.

*The second embodiment of invention*

Figure 6:
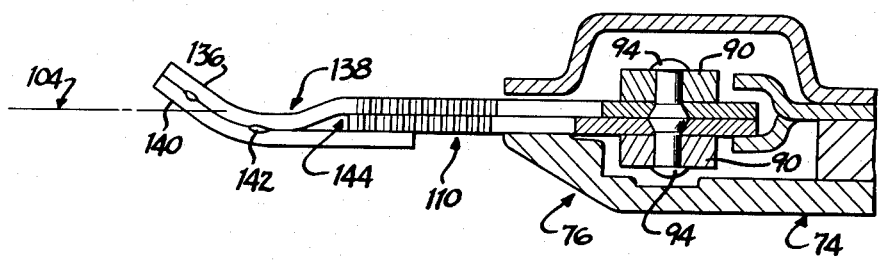
FIGURE 6 is a fragmentary section view similar to FIGURE 4, but illustrating a second embodiment of the invention.

As shown in FIGURE 6, a modified structure embodying the operative principles of the present invention includes a lower sickle having triangular teeth 110 flush-riveted as at 94 to a runner bar 90 suitably of cold-rolled steel. The lip 76 of the lower sickle bar support 74 provides support and a focal point for the reactive force.

In this embodiment, the upper sickle section comprises generally the same elements in plan view as shown in FIGURE 5 and these are fastened to the bottom side of upper runner bar by flush riveting as at 94. However, at the forward ends, the tip or point 136 is offset downwardly as at 138 and reverses upwardly again to extend vertically beyond the cutting plane. This section has a short pointed clip 140 spot welded as at 142 to the underneath side, and the clip extends back parallel to the bottom surfaces of the teeth 110 of the lower section. Note that a space 144 is provided that is large enough to accommodate the lower section to run between the upper section and the clip. This configuration provides all components in proper, operative relation.

From FIGURE 6, it will be evident that the upper section can be made as in FIGURE 5 and FIGURE 4, that is, without the offset 138 shown in FIGURE 6. Then the clip could follow the contour of the upper section but be offset to receive the forward portion of the bottom sections 110.

From the foregoing, it will be evident that a novel concept in mower structures is provided with the following advantages:

(1) A highly successful structure adapted for cutting heaviest crops with substantially reduced maintenance.

(2) Since the sections are running flat and in parallel alignment, there is an improved self-sharpening action.

(3) The serrated edges can be formed opposite a beveled edge for the ultimate in cutting action. The self-sharpening action and the components of force developed provide unexpectedly good operation.

(4) Where, however, serrations are utilized, these have been observed to remain sharp and prominent for an indefinite period, in fact, until the sections wear completely in two.

From the foregoing, it will also be evident that all cutting takes place back of the tips of either section. This, too, is an improvement as regards the development of a higher degree of friction between the stem of the hay and the cutting edge.

We claim:
1. In a mower, an elongate cutter bar, an elongate upper sickle section having a series of cutting teeth projecting forwardly from one side thereof, an elongate lower sickle section having a series of cutting teeth projecting forwardly from one side thereof, means mounting said sickle sections upon said cutter bar for sliding longitudinal reciprocatory movement relative to said cutter bar and to each other, the teeth on said upper sickle section overlying the teeth on said lower sickle section in sliding cutting relationship therewith, forwardly projecting tip portions on the teeth of said upper sickle section projecting forwardly from said cutter distance a substantial distance beyond the tips of the teeth on said lower sickle section, and a clip secured to the lower side of each of said tip portions and projecting rearwardly therefrom into sliding underlying relationship with the teeth of said lower sickle section.

2. In a mower as defined in claim 1, the further improvement wherein the portion of said tip portion located forwardly of the tips of the teeth of said lower sickle section is capable of limited resilient deflection in a downward direction, downward deflection of said tip portion being operable to force said clip upwardly against the teeth of said lower sickle section.

3. In a mower as defined in claim 1 the further improvement wherein the overlapped cutting edge portions of the teeth on the upper and lower sickle sections are serrated.

4. In a double sickle bar mower having upper and lower sickle sections, each such section having a series of cutting teeth projecting forwardly from one side thereof, means supporting said sickle sections for longitudinal reciprocatory movement and means for driving said sickle sections in reciprocatory movement; clips secured to and projecting rearwardly from the tip portions of the upper section teeth to underlie the teeth of the lower sickle sections, the lower sickle section teeth thus being vertically interposed between and in close running relation to the teeth of the upper sickle section and said clips, respectively.

References Cited by the Examiner

UNITED STATES PATENTS

| 16,057 | 11/56 | Hubbard | 56—297 |
| 795,078 | 7/05 | Vizard | 56—297 |
| 2,735,254 | 2/56 | Huddle | 56—297 |

T. GRAHAM CRAVER, *Primary Examiner.*

RUSSELL R. KINSEY, *Examiner.*